United States Patent [19]

Clark

[11] 3,744,390
[45] July 10, 1973

[54] AUTOMATIC COIN-OPERATED PHOTOGRAPHIC APPARATUS UTILIZING SELF-DEVELOPING FILM UNITS

[76] Inventor: Charles William Clark, Kings Grove, Maidenhead, Berkshire, England

[22] Filed: Mar. 27, 1972

[21] Appl. No.: 238,071

[30] Foreign Application Priority Data
Mar. 29, 1971 Great Britain..................... 8,023/71

[52] U.S. Cl.......................... 95/14, 95/19, 95/89 R, 250/66
[51] Int. Cl. .......................................... G03b 17/50
[58] Field of Search ..................... 95/14, 13, 19, 23, 95/89 R; 250/66

[56] References Cited
UNITED STATES PATENTS
3,636,844 1/1972 Kamp...................... 95/13
3,604,329 9/1971 Land....................... 95/13
3,415,988 12/1968 Gidlund.............. 250/66
3,631,781 1/1972 Kennington et al. ............... 95/14
3,618,505 11/1971 Clark ................................ 95/14 X Primary Examiner—Samuel S. Matthews
Assistant Examiner—Richard L. Moses
Attorney—Granville M. Brumbough, Ronald B. Hildreth et al.

[57] ABSTRACT

Automatic coin-operated photographic apparatus for operation with cassettes each comprising a number of self-developing film units. The apparatus includes a camera, a magazine for the cassettes, and transfer means for replacing an expended cassette at the camera by a cassette from the magazine.

12 Claims, 17 Drawing Figures

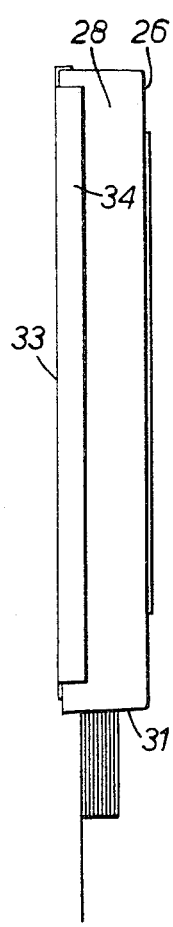
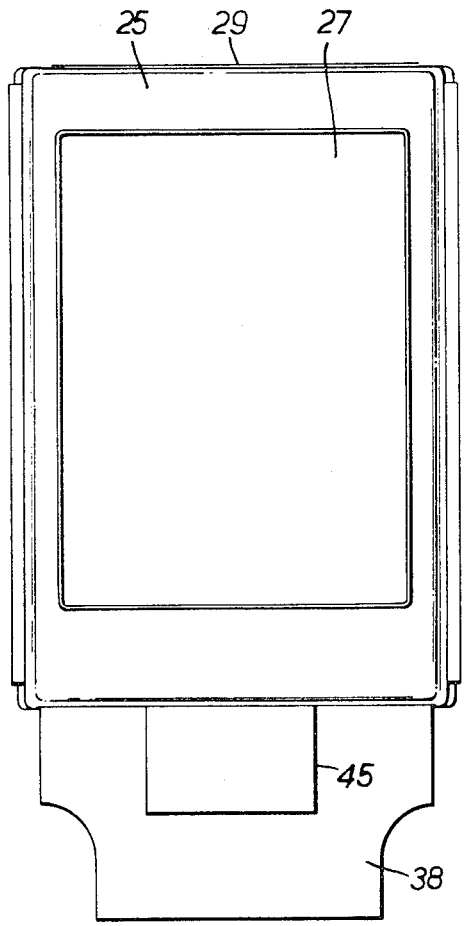
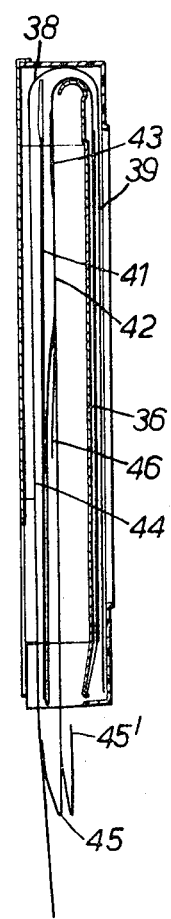
FIG.3.   FIG.4.   FIG.6.
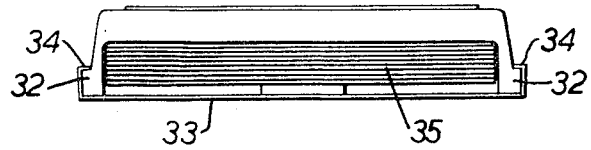
FIG.5.

AUTOMATIC COIN-OPERATED PHOTOGRAPHIC APPARATUS UTILIZING SELF-DEVELOPING FILM UNITS

This invention relates to photographic apparatus. The invention relates particularly but not exclusively to apparatus suitable for use in automatic photographic equipment of the kind which is arranged to be brought into operation by actuation of an initiating mechanism and upon such actuation, as by the insertion of a coin in a slot, applies to a piece of photosensitive sheet material disposed in an exposure position, one or more latent images of a subject occupying an appropriate position, as by being seated on a suitable stool in a sitter's compartment, the photosensitive sheet material then being developed to produce a final print which is delivered as a finished photograph to the sitter. Examples of such apparatus are to be found in my British Pat. specifications Nos. 1,053,854 and 1,216,477.

Such photographic apparatus has hitherto required the provision of baths of chemicals and a complex mechanism for dipping the photosensitive sheet successively into a number of baths containing different chemicals and, sometimes, washing fluid and then drying the photograph before delivery. The treatment chemicals rapidly become ineffective because they either become exhausted or become contaminated by carry over from preceding tanks. Such photographic apparatus is normally located in stores, railway stations, airports and the like where no skilled maintenance facilities are available. Consequently, service engineers have to visit each site at frequent intervals to carry out the messy and time-consuming replacement of the chemicals. In addition, a fairly complex mechanism is required to effect the dipping and this mechanism has to operate in an adverse environment due to the corrosive nature of the treatment chemicals. Consequently, breakdowns occur quite frequently and parts often need replacement, leading again to the necessity for visits from the service engineer. To the actual cost of such visits must be added the loss of revenue occasioned by the apparatus being out of use during regular maintenance and as a result of breakdown.

According to the present invention automatic photographic apparatus comprises a camera, a magazine for cassettes, each comprising a number of self-developing film units, and transfer means for replacing an expended cassette at the camera by a cassette from the magazine, the transfer means comprising a conveyor extending from the magazine to the camera.

One form of self-developing film unit is available in cassettes from Polaroid Corporation of Cambridge, Massachusetts, United States of America. Each film unit comprises a photosensitive sheet which is exposed by the lens system of the camera to form thereon a latent image and an image-receiving sheet which, during development, is in superposed relation with the photosensitive sheet. The unit also includes a rupturable pod releasably containing a processing liquid which is spread between the contiguous sheets. The imbibition process resulting from this liquid distribution serves to transfer, at least in part, image components from the photosensitive sheet to the image-receiving sheet which forms the finished photograph.

Preferably the optical axis of the camera is vertical and the conveyor comprises a support element having an upper surface to support a cassette and drive means to reciprocate the support element beneath the magazine. There may be a one-way gate preventing cassettes moved beyond the gate on a forward stroke of the support element returning on a rearward stroke and there may be a stationary track extending from the end of the support element remote from the magazine to the camera. Thus a train of cassettes may be built up on the support element and the stationary track, the train being moved forward on a forward stroke of the support element but being restrained from moving back by the one-way gate on a rearward stroke of the support element.

The magazine may include a number of vertical chutes for cassettes, each chute except that nearest the camera including a dummy cassette, there being means to prevent the dummy cassette from being conveyed along the conveyor beyond a predetermined point.

In a preferred construction, the magazine comprises a vertical chute for cassettes having a ledge at the bottom facing towards the camera and pusher means arranged to push the bottom cassette off the ledge when the support element approaches its position furthest from the camera.

The apparatus preferably includes a carrier beneath the camera located to receive a cassette from the conveyor and means to raise the carrier with a cassette towards the camera, the raising means preferably being synchronised with the conveyor.

The invention may be carried into practice in various ways but one particular automatic photographic studio containing photographic apparatus embodying the present invention will now be described by way of example with reference to the accompanying drawings, in which:

FIGS. 3, 4 and 5 are side, front and bottom elevations respectively of a film pack or cassette of the kind which is used in the photographic apparatus of the studio shown in FIGS. 1 and 2;

FIG. 6 is a somewhat diagrammatic section through a cassette, the cassette shown in FIGS. 3 and 5 containing when full a plurality of film units;

Figure 1:
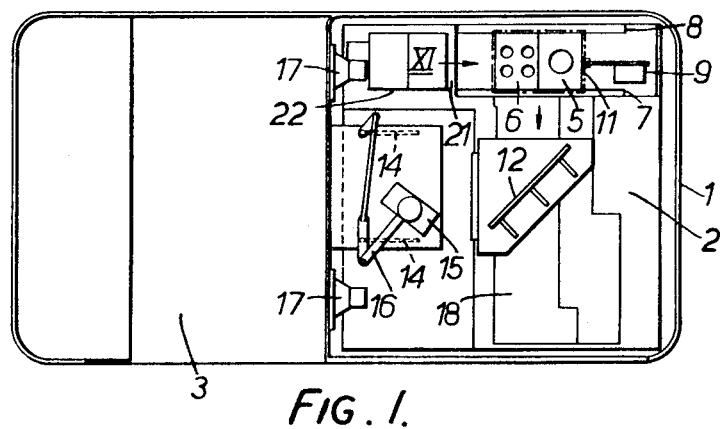
FIG. 1 is a plan view of the studio with the roof of the cubicle removed and showing in simplified form the photographic apparatus contained in the studio.

The construction and operation of the apparatus will be outlined in an introduction and the parts of the apparatus and their operation will then be described in detail. It will be appreciated, however, that those parts which are not of direct importance to the invention and those parts which are purely of conventional construction will not be described in detail. For example, details of the drive means, the timing means and the control means which are necessary to cause the apparatus to operate in correct sequence in the manner described will not be set out in detail since their construction and operation can easily be arrived at by those familiar with the art.

INTRODUCTION

The apparatus shown in the drawings is of the kind in which a member of the public sits to have one or more portrait photographs produced automatically on prepayment by insertion of a coin into the apparatus.

Figure 2:
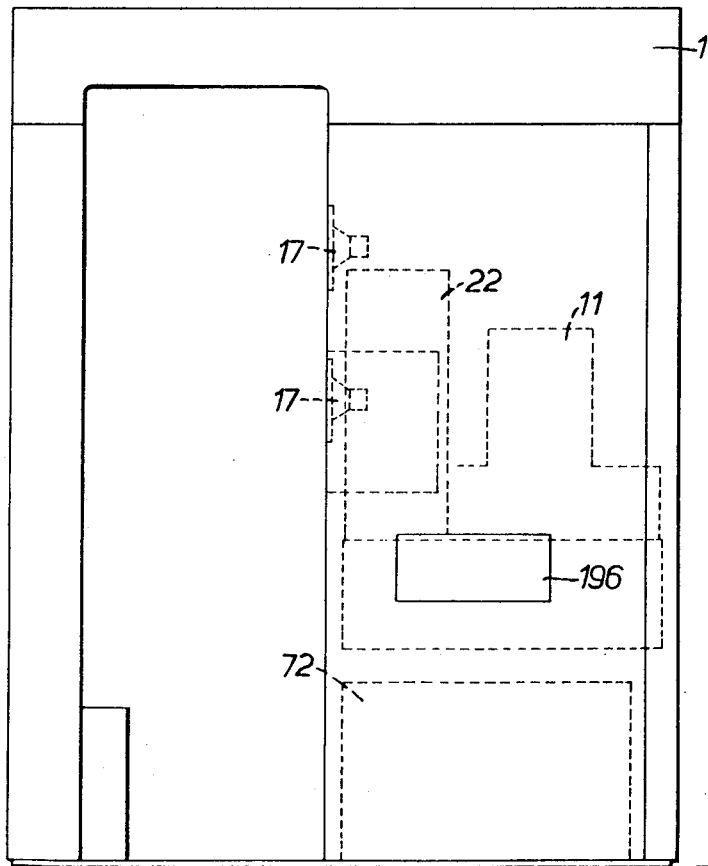
FIG. 2 is a front view of the photographic studio.

As shown in FIGS. 1 and 2, the photographic apparatus is housed in a cubicle indicated generally at 1 which is divided into a first portion 2 containing the photographic apparatus and a second portion 3 in which the person to be photographed sits. The exposures are made on sheets of sensitized film contained in a cassette (not visible in FIGS. 1 and 2). Two cameras 5 and 6 are mounted side by side and can be moved as a unit on guide rails 7 and 8 by means of an electric motor 9 between two extreme positions in each of which one of the cameras is above the cassette. The cameras have their optical axes vertical with the lenses at the top and can "see" the sitter by means of mirrors 11 and 12 and a window which is fitted in the partition between the portions 2 and 3 of the cubicle. The window can be closed by doors 14 when the apparatus is not in use. The mirror 12 is rigidly connected to the frame of the apparatus by three pillars 13 and the mirror 11 is attached to the camera unit. The doors 14 are operated by an electric motor 15 through a linkage 16. One of the cameras 5 is arranged to take a single large exposure and the other 6 is arranged to take four smaller exposures. The sitter decides which he requires and, if he requires four, he may also select whether he requires four identical pictures which will be exposed simultaneously or four different pictures exposed in succession. There is an electronic flash unit operating two discharge tubes 17 and synchronised with the shutter of whichever camera is in use.

When a film has been exposed it is withdrawn from the cassette by conveying apparatus 18 and is simultaneously passed between a pair of rollers to initiate development. The conveying apparatus 18 is arranged to hold the film unit in a dwell position for an appropriate period while development takes place and then to pass the film through stripping apparatus 19 where the print is stripped from its backing and delivered for collection by the sitter. The backing is then released by the conveying apparatus which is then ready for another cycle.

Each cassette contains when full eight sheets of film each forming part of a self-developing film unit and an opaque sheet of paper to protect the unexposed film units. The sheet is withdrawn to reveal the film units after the cassette has been placed in the camera. When all eight film units have been withdrawn from the cassette by the conveying apparatus 18, the cassette is removed from the camera by transfer apparatus 21, which also replaces it by a full cassette which is drawn from a magazine 22.

CASSETTE

As can be seen in FIGS. 3, 4 and 5 each cassette 24 consists of a body 25 having a front wall 26 in which there is a rectangular opening 27, side walls 28, a top wall 29 and a bottom wall 31 which is only about a third as deep as the side and top walls. The side walls are formed with steps 32 and the cassette is completed by a flat back 33 having, along the two side edges, hooked flanges 34 which slide over the steps 32 to retain the back on the body. Accordingly there is an opening 35 at the bottom end the purpose of which will be described hereafter. Within the cassette there is a separator plate 36 having a smoothly hooked upper end.

When the cassette is full, eight film units are folded around the separator plate 36 and an opaque sheet of paper 38 extends around the film units. The opaque sheet is removed before use and the film units are removed successively as they are exposed. For convenience, FIG. 6 shows only the opaque sheet and a single film unit. Each film unit consists of a flexible sensitized sheet 39 of film, a stiffish transfer or image-receiving sheet 41 to receive the finished photograph, a first connecting strip 42 carrying a pod 43 of developing fluid, a second connecting strip 44, and a narrow leader strip 45. These components are assembled together in the manner shown in FIG. 6, the first connecting position 42 and the second connecting portion 44 being arranged to form a leader tab 46 which is somewhat narrower than the remainder of the unit.

Cassettes of the construction described and containing film units of the construction described are obtainable from the Polaroid Corporation.

It will now be realized that the photographic apparatus consists, apart from the cameras and the control apparatus which will not be described in detail, of two main portions, namely (a) the cassette supply comprising the magazine and the transfer apparatus and (b) the film handling means comprising the film conveying apparatus and the stripping mechanism. These will now be described in greater detail.

CASSETTE HANDLING APPARATUS

The cassette transfer apparatus 21 is shown in detail in FIGS. 7 to 10 and directional references in this section of the description will refer to the apparatus as seen in these Figures. The cassette transfer apparatus consists essentially of a generally rectangular horizontal plate 47 which is supported on the frame of the apparatus by guides 48 so that it can slide in the direction of the arrow 49. A pusher block 51 is fixed to the upper surface of the plate 47, and is provided with upwardly projecting ridges 52 and 53 whose function will be described below.

The magazine 22 is mounted above the plate 47, and consists of two guides 54 and 55. The guide 55 is rectangular in plan, and of a suitable size to accommodate cassettes with their large faces horizontal; the guide 54 is similar except that it has an extra, smaller section 56 which is also rectangular in plan. The gap between the bottom of the guides and the top of the plate 47 is rather greater than the thickness of a cassette. Most of one face of each guide is cut away to allow cassettes to be stacked in the guides without difficulty. At the bottom of each guide a ledge 57 is provided; in the case of the guide 54, the ledge 57 does not extend across the section 56. The corresponding edge of the lowermost cassette in each guide is supported by the ledge 57.

Figure 7:
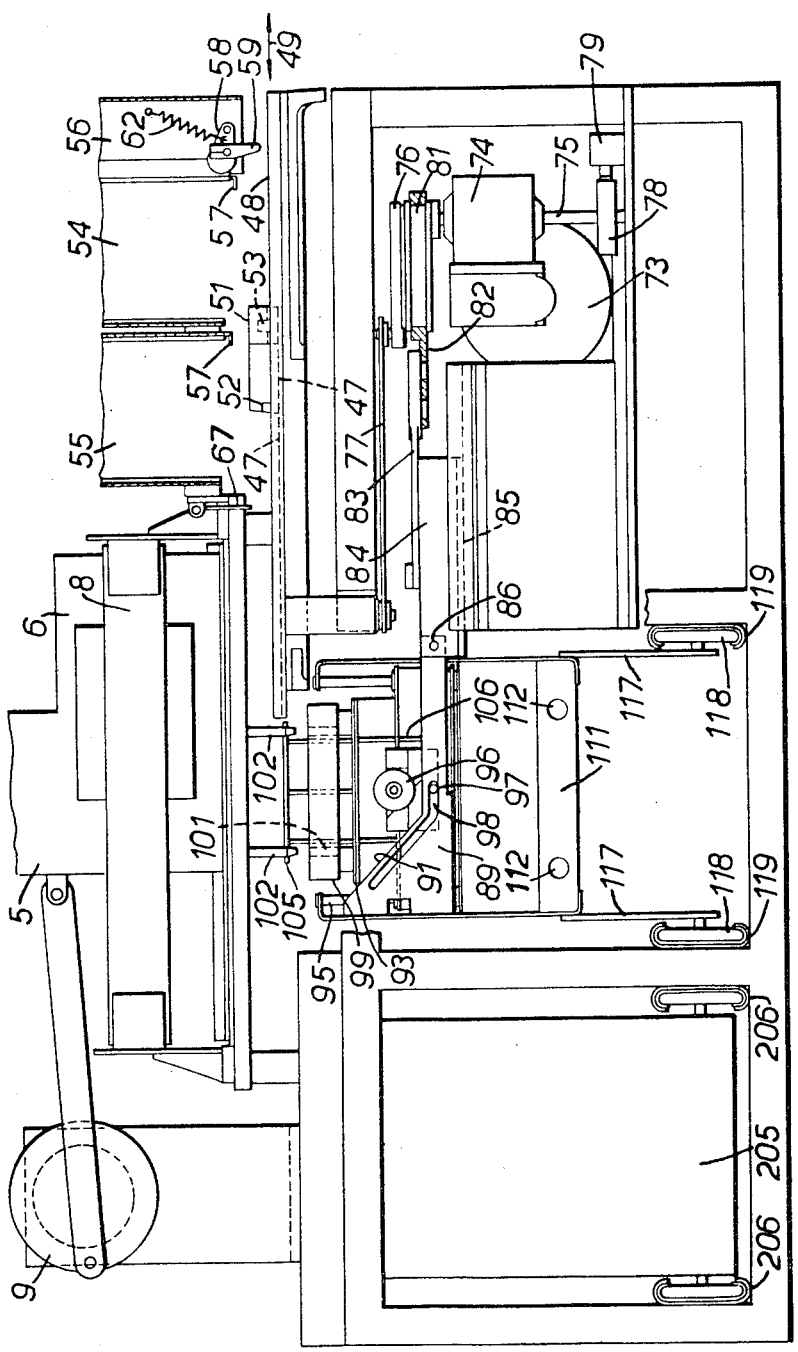
FIG. 7 is a rear view of the cassette transfer mechanism of the photographic apparatus.
Figure 8:
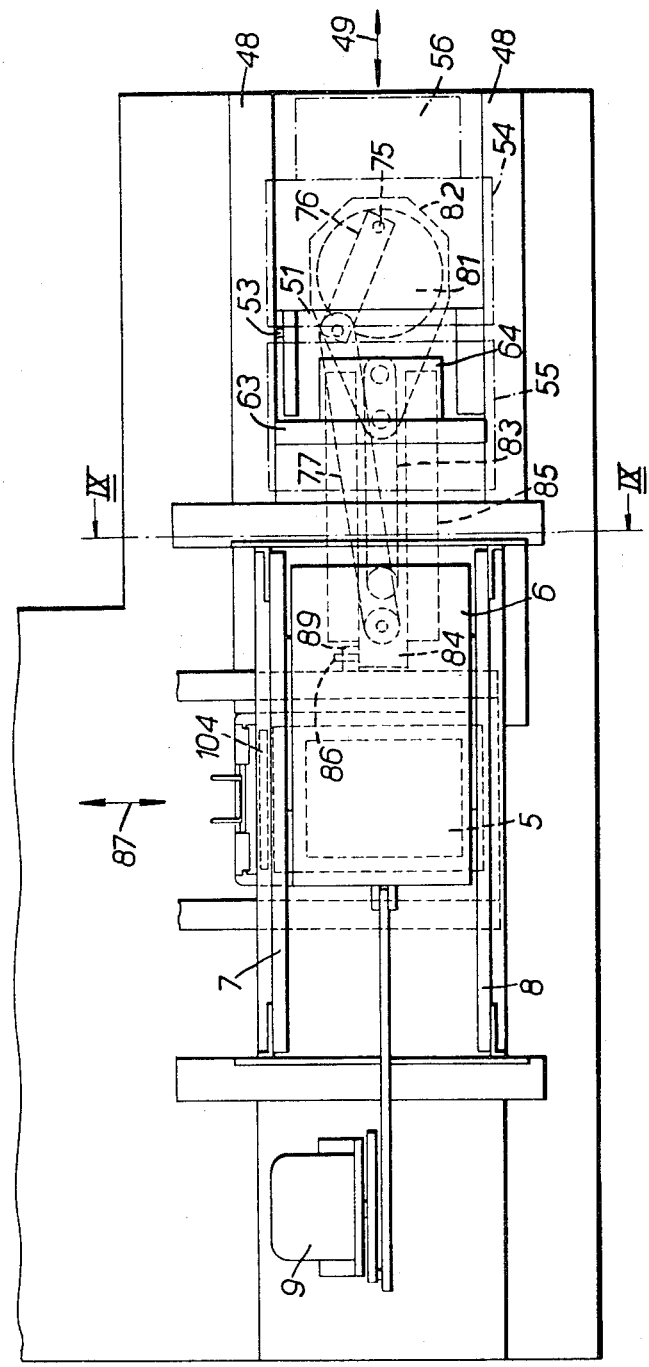
FIG. 8 is a plan view of the cassette transfer mechanism.
Figure 9:
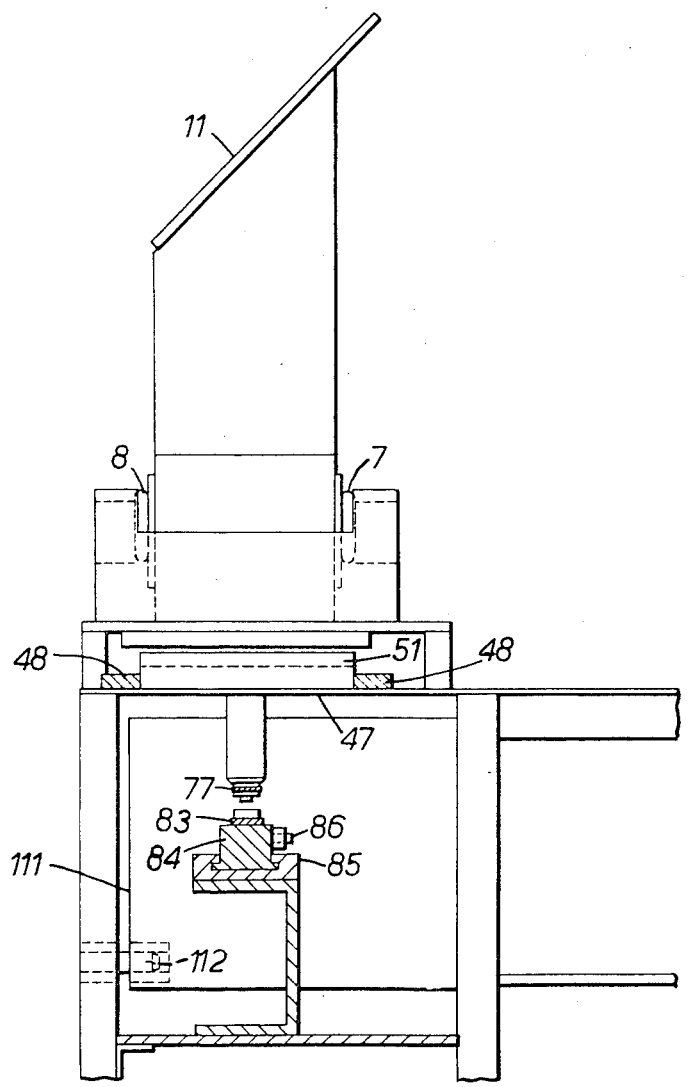
FIG. 9 is a vertical section on the line IX—IX in FIG. 8.

A feed cam assembly 58 is rotatably mounted adjacent the ledge 57 of the guide 54, and is shaped so that when rotated anticlockwise as seen in FIG. 7, it will push the lowermost cassette in guide 54 off the ledge 57.

A tappet 59 is fixed on the shaft 61 of the feed cam assembly 58, and is lifted by the ridge 53 on the pusher block 51 as the plate 47 approaches its most rightward position so as to rotate the feed cam assembly anticlockwise. When the plate 47 moves away from this position, the tappet 59 is again lifted by the ridge 53, but this time the rotation is in the opposite direction. A spring 62 biases the feed cam assembly 58 to a position in which the cams do not project into the guide 54.

When stacking cassettes in the guide 54, a dummy cassette 63 is placed on top of the stack of cassettes. This dummy cassette resembles an ordinary cassette in size and shape, except that it has a rectangular projection 64, which is accommodated by the section 56 of the guide 54 and it is rather thinner than a normal cassette. The projection 64 has a groove 65 in its underside, and a metal plate having two upward projections 66 is attached to its right-hand edge.

A backstop 67 is pivotally attached to the outside of the guide 55 so that it can be lifted to the left but cannot move beyond a vertical position in the opposite direction. In the absence of any other influence, the backstop 67 hangs vertically downwards.

Figure 10:
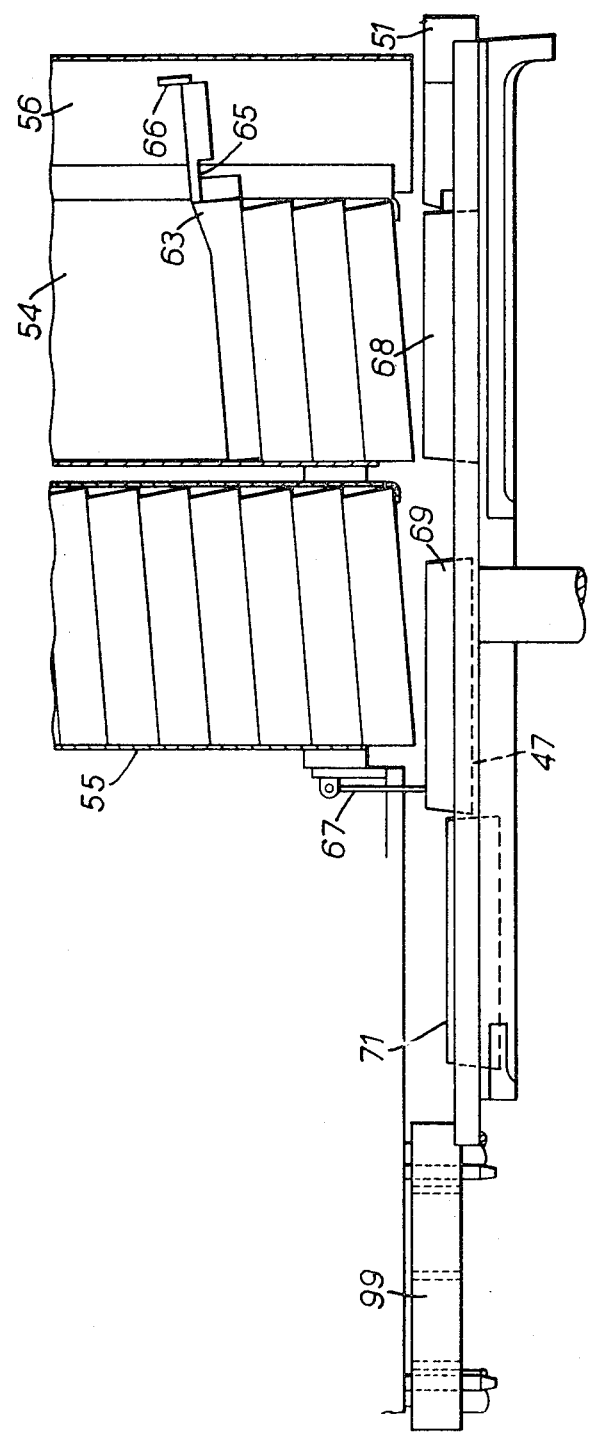
FIG. 10 is a rear view of the cassette transfer mechanism similar to part of FIG. 7 but showing a number of cassettes in position.
Figure 11:
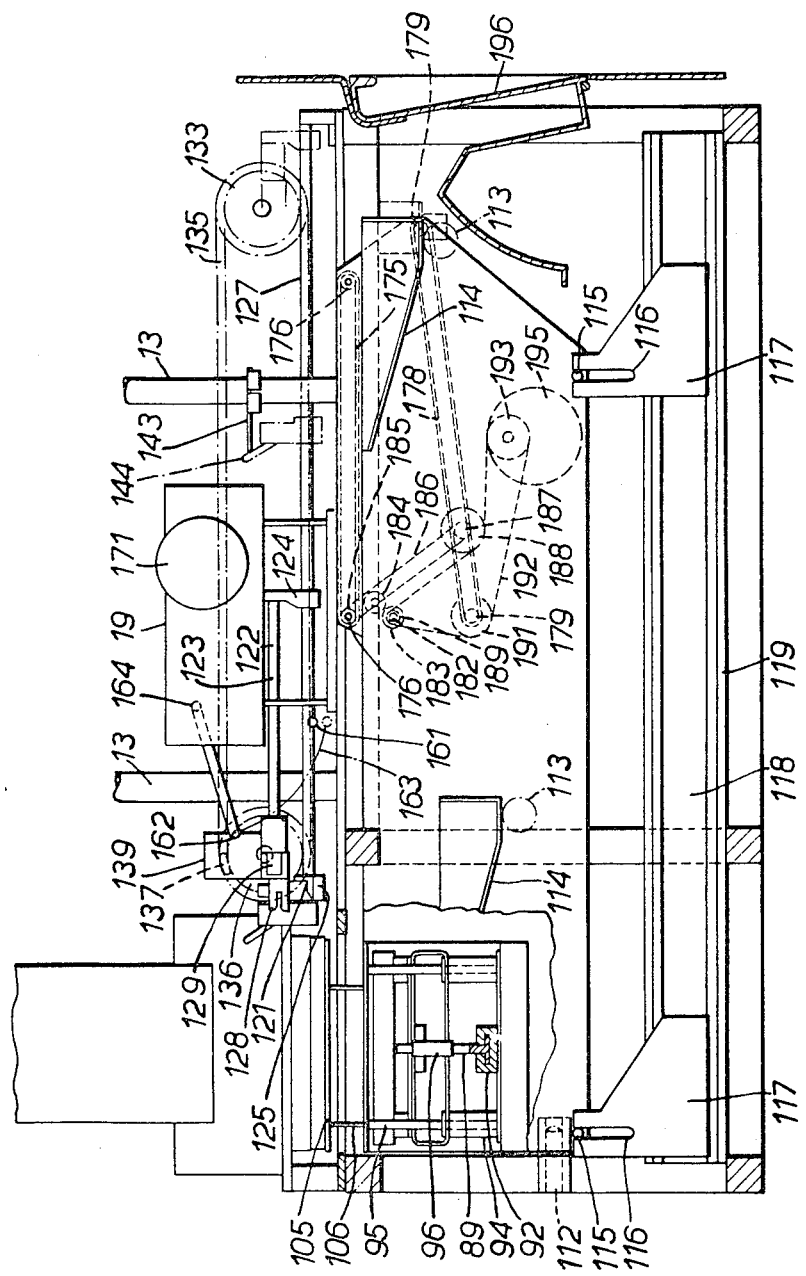
FIG. 11 is an elevation of part of the film handling means viewed in the direction of the arrow XI in FIG. 1.
Figure 12:
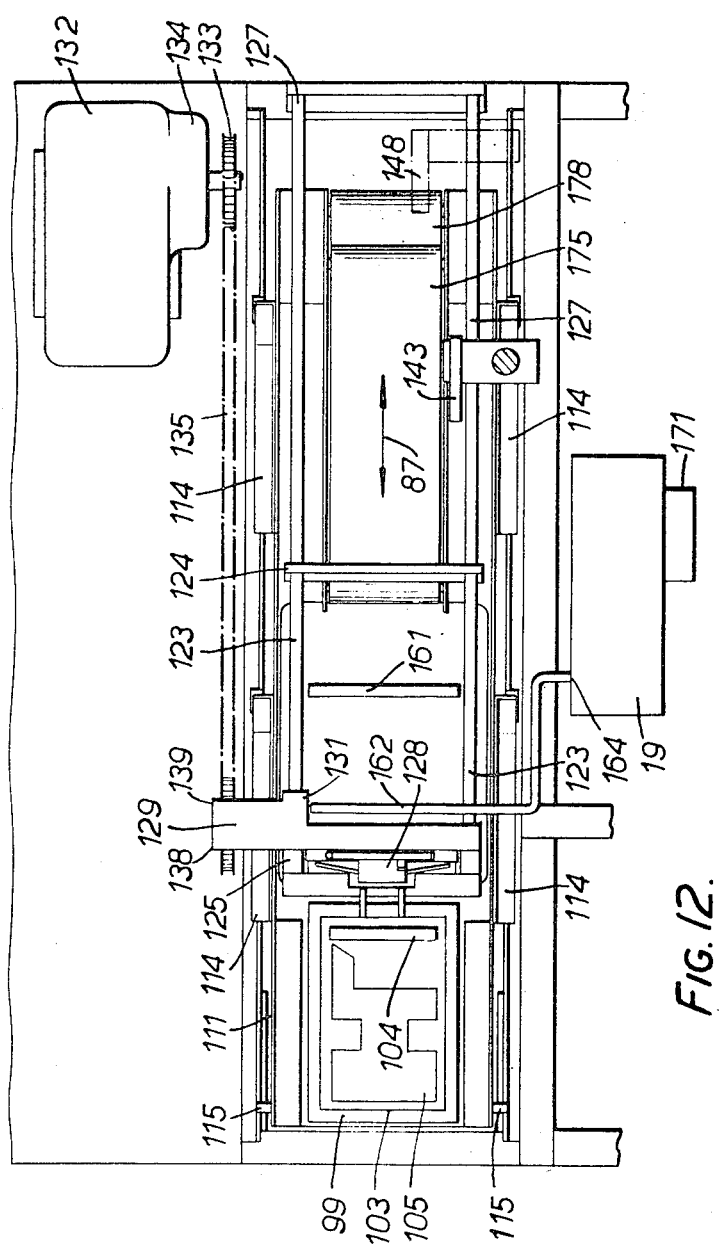
FIG. 12 is a plan view of the film handling means.

In operation, the normal position of the plate 47 is at the extreme right-hand end of its travel, as shown in FIGS. 7 and 10. Two cassettes are resting on the plate 47 at 68 and 69. Another cassette is resting on the frame of the apparatus at 71. When the cassette beneath the camera 5 or 6 is exhausted, the plate 47 is moved to the left by mechanism yet to be described. The cassette resting on the frame of the apparatus at 71 is pushed beneath the camera by the end of the plate 47, and in doing so it pushes the exhausted cassette beyond the camera to a point where it is free to fall into a receptacle 72 for disposal. The plate 47 then returns to its original position. As it does so, the backstop 67 engages with the opening in the top of the cassette resting on the plate 47 at 68, and prevents the cassettes from returning with the plate to their original positions. As a result, plate 47 is withdrawn from below the cassette which is resting on it at 69, allowing it to drop onto the frame of the apparatus at 71. Also, the lowermost cassette in the guide 54 will no longer be supported at its left-hand edge when block 51 has returned to its original position. The cassette will drop at its left-hand edge, and will then be pushed off the ledge 57 by the feed cam 58, so that it drops onto the plate 47 at 68. The other cassettes in the guide 54 will also drop, so that the next cassette is supported at one edge by the ledge 57, and at the other by the cassette at 68.

The process described above occurs so long as there is a cassette in the guide 54. However, when the guide is empty, the dummy cassette 63 drops onto the plate 41 at 68. During the forward stroke of the plate 47, the mechanism will function as before except that the projections 66 on the dummy cassette 63 push the lowermost cassette in the guide 55 off the ledge 57; slots are provided in the guide 55 to allow the projections 66 to act on the cassette. As the plate 47 returns to its normal position, the backstop 67 does not touch the dummy cassette 63, because it is thinner than a normal cassette and the dummy cassette is drawn back with the plate 47 because of the engagement between the ridge 52 and the groove 65. The backstop 67 will engage with the edge of the cassette resting on the plate 47 at 69, preventing it from moving with the plate. The lowermost cassette in guide 55 will drop onto the plate 47 at 69 as soon as it is no longer supported by the dummy cassette 63, and the other cassettes in the guide 55 will also drop; the lowermost cassette in the guide will be supported by the ledge 57 at one edge and by the cassette resting on the plate 47 at 69 at the other edge.

The mechanism which moves the plate 47 consists of an electric motor 73 driving through a double reduction worm gearbox 74 having a vertical output shaft 75 which carries a crank arm 76. A link 77 is pivotally connected to the plate 47 at one end and to the crank arm 76 at the other end, so that the plate 47 can be reciprocated over a distance fixed by the length of the crank arm 76.

The shaft 75 carries a cam 78 at its lower end and a micro-switch 79 is fixed to the frame of the apparatus so that its operating lever presses against the cam 78. The switch 79 acts as a limit switch to stop the motor 73 when the plate 47 is in its most rightward position.

The shaft 75 also carries an eccentric sheave 81. An eccentric strap 82 runs on the sheave, and is connected by an eccentric rod 83 to a slide 84, which is mounted on guides 85 so that it can slide in the direction of the arrow 49. The slide 84 carries a pin 86 at its left-hand end; the pin projects in the direction of the arrow 87, and engages with a hole 88 in a ramp member 89 which has an inclined surface 91. The ramp member is mounted in guides 92 so that it can slide in the same direction as the slide 84. A cradle 93 is provided with four guides 94 so that it can slide in a vertical direction on four rods 95 which are attached to the frame of the apparatus. A roller 96 is rotatably mounted on the cradle 93, and arranged to contact the inclined surface 91 of the ramp 89. In operation, when the ramp 89 is pulled to the right by the slide 84, the surface 91 acts on the roller 96 to lift the cradle 93 on the guide rods 95. A pin 97 is attached to the cradle 93 and passes through a slot 98 formed in the ramp 89. The slot is shaped so that it ensures that the cradle 93 descends when the ramp 88 moves to the left.

A camera back 99 is mounted on top of the cradle 93 and is provided with two holes 101 which engage with two dowel pins 102 when the cradle 93 is lifted. The dowels 102 are fixed to the frame of the apparatus. A cassette holder 103 is mounted on the camera back 99 and is provided with springs to press the cassette upwards against the camera. It is also provided with two rollers 104 between which the film unit passes as it is withdrawn from the cassette, and which rupture the pod 43 to initiate development.

A cassette support plate 105 is supported on the frame of the apparatus by three vertical rods 106 which are attached to the plate 105. The rods 106 pass through holes in the cassette holder 103, the camera back 99, and the cradle 93, and rest on a fixed part of the apparatus while the cradle is in its lowest position.

The cassette support plate 105 is arranged to be level with the bottom of the cassette at 71 in this position, so that the cassette can slide on to the plate smoothly. When the cradle moves to its highest position, the plate 105 is lifted along with the cassette by the cassette holder 103.

The crank arm 76 and the sheave 81 are mounted on the shaft 75 in such positions that as plate 47 returns on its normal position, the cradle 93 is lifted, thereby raising the cassette beneath the camera into its working position. Conversely, when the cassette is exhausted, the cradle 93 is lowered before the plate 47 has moved far enough to move the exhausted cassette. In this way, the cassette is held firmly while it is in use but is released so that it can be replaced by a fresh cassette when it is exhausted.

In normal operation, the cassette handling apparatus is actuated as soon as all eight film units in a cassette have been withdrawn; a counter is provided to determine when this occurs. As soon as a fresh cassette has been positioned in the camera, the opaque paper sheet 38 in withdrawn by the film handling apparatus, in a manner yet to be described.

To simplify maintenance, certain parts of the cassette handling apparatus are mounted on a part of the frame of the apparatus which forms a sub-assembly 111 which can easily be removed from the apparatus. These parts are the ramp 89 and its guides 92, the cradle 93 and its guides 94 and 95, the camera back 99, the casette holder 103, and the plate 105 together with rods 106. Certain components of the film handling means are also mounted on the sub-assembly 111. The arrangement of the sub-assembly will be described below.

FILM HANDLING MEANS

The film handling means is shown in FIGS. 11 to 17 and includes film conveying apparatus which consists essentially of two clamps to grip the leader strip 45 and the leader tab 46 respectively on an exposed film unit and means for guiding and driving the clamps in the direction of the arrow 87 to draw the film unit from the cassette. The film handling means also includes a stripping mechanism which consists essentially of a pair of guides, one of which is retractable, which engage the film unit as it is drawn out of the cassette.

The film conveying apparatus includes a lower clamp 121 which is mounted on a lower carriage assembly 122. The assembly 122 comprises two guide rods 123 and two bridge pieces 124 and 125 which together form a rectangular frame. Each of the bridge pieces 124 and 125 is provided with guides 126 directly below guide rods 123 so that the carriage assembly 122 can slide on two further guide rods 127 which are fixed to the frame of the apparatus.

An upper clamp 128 is mounted on an upper carriage 129 which is provided with guides 131 so that it can slide on the guide rods 123.

An electric motor 132 is mounted on the frame of the apparatus, and drives a sprocket 133 by means of a single reduction worm gearbox 134. A roller chain 135 passes around the sprocket 133 and around an idler sprocket 136, situated so that between the sprockets 133 and 136 the chain 135 is parallel to the guide rods 127. A tappet 137 is fixed to the chain 135, which is arranged to move away from the camera on its upper side while the motor 132 is running.

Two thrust members 138 and 139 are mounted on the carriage 129. Each thrust member has a surface adapted to engage the tappet 137; that on thrust member 138 engages it while it is moving towards the camera, while that on thrust member 139 engages it while it is moving away from the camera. The thrust members 138 and 139 are also arranged so that as the tappet 137 passes around either of the sprockets 133 and 136, it disengages from one thrust member, and engages with the other thrust member shortly afterwards. In this way, the carriage 129 can be reciprocated by operating the motor 132. The carriage assembly 122 will also reciprocate over a smaller distance, since it is in effect coupled to the carriage 129 by a lost motion connection.

Two micro-switches (not shown) are mounted on the frame of the apparatus so that their operating levers engage the carriage 129 at certain points in its travel; these allow its motion to be controlled as required.

Each of the clamps 121 and 128 comprises a pair of jaws one of which is spring loaded towards the other. The lower clamp 121 is opened at the end of its travel nearest the camera by a projection 141 which is attached to the frame of the apparatus, and acts on the jaw 142 of the clamp 121; at the other end of its travel, the clamp is held open by a stop 143 which acts on a lever 144 associated with the clamp 121.

The upper clamp 128 is provided with a latch 145; when the clamp is opened, the latch engages with a projection on the jaw 146 to hold it open. A lever 147 is pivotally attached to the clamp, and engages a stop 148 when the clamp is at the end of its travel furthest from the camera. The jaw 146 is in turn opened by the lever 147. At the other end of its travel the latch 145 engages with a stop 149, which lifts the latch and allows the clamp to close.

Two leaf springs 151 are fixed to the carriage 129 with their ends projecting into the clamp 128 so that when the clamp is open, they ensure that the tab previously gripped by the clamp is ejected.

Figure 13:
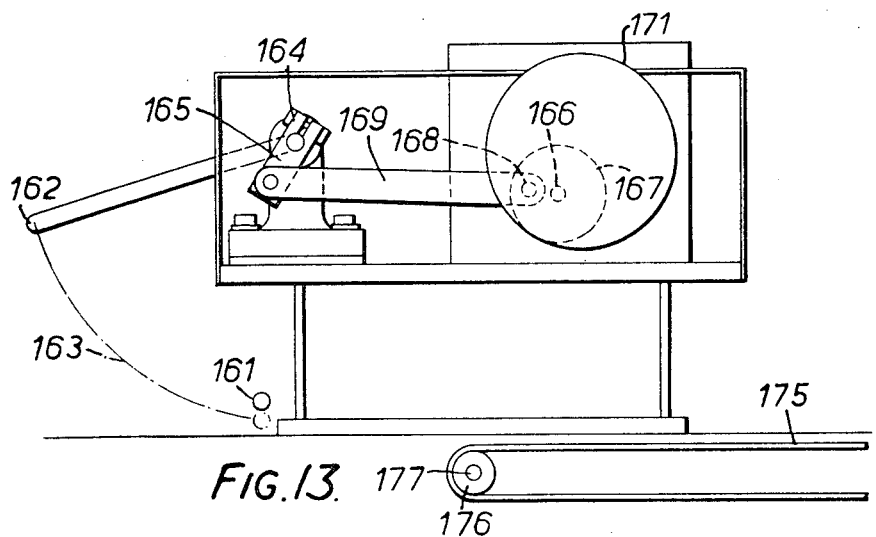
FIG. 13 is an elevation of a stripper mechanism forming part of the film handling means.
Figure 14:
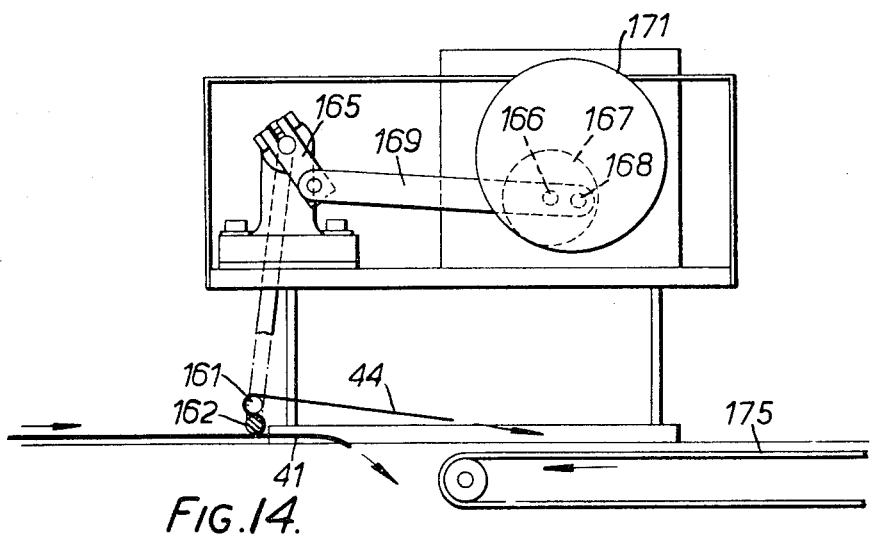
FIG. 14 is a view similar to FIG. 13 showing the stripper mechanism in operation to separate a developed print from the backing.
Figure 15:
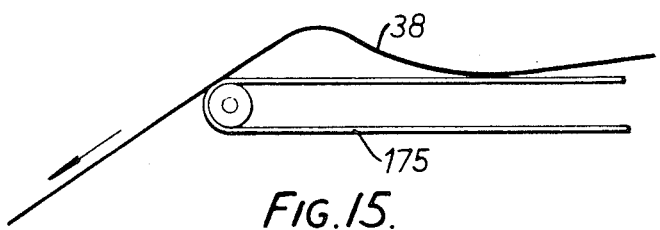
FIG. 15 is a view similar to FIG. 13 showing an opaque sheet which has been operated upon by the stripper mechanism.
Figure 16:
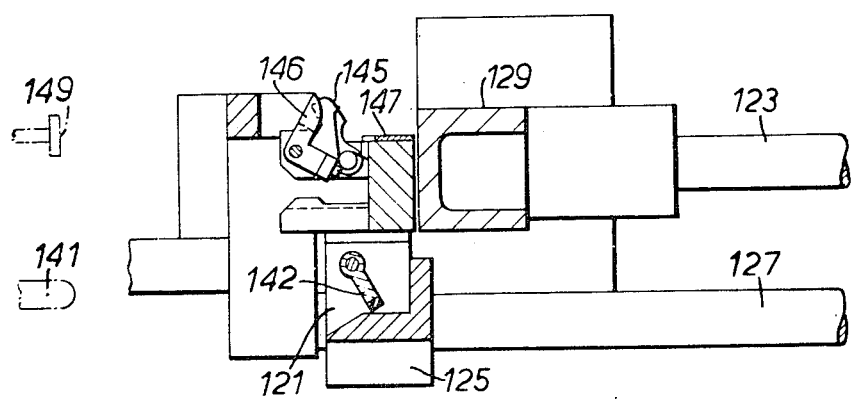
FIG. 16 is a detailed vertical section of the clamps forming part of the film handling means in a position different from that shown in FIGS. 11 and 12.
Figure 17:
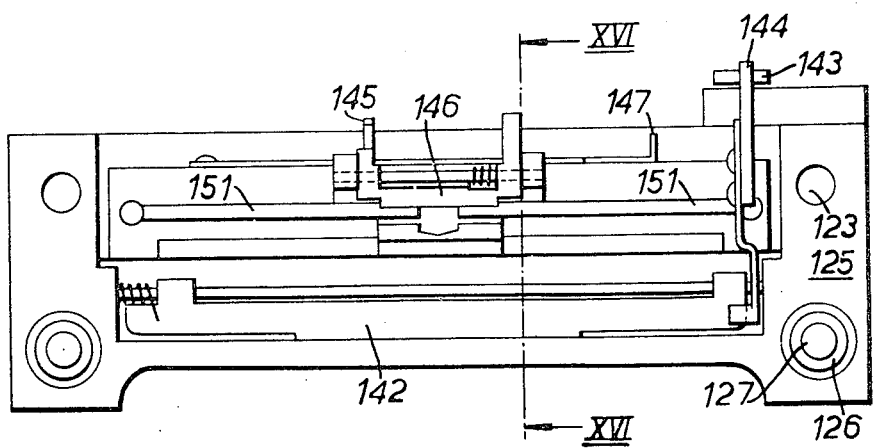
FIG. 17 is an elevation of the clamps looking in the direction of an arrow XVII in FIG. 16.

The stripping mechanism which is shown in detail in FIGS. 13 to 15 is mounted on the frame of the apparatus and comprises a first guide 161 which is fixed and a second guide 162 which can be moved in an arc as shown at 163. To this end, the guide 162 is rotatably mounted on the frame of the apparatus at 164. A crank arm 165 is fixed to the shaft of guide 162. Another shaft 166 is rotatably mounted on the frame of the apparatus and carries a disc 167. A crankpin 168 is attached to the disc 167 and a link 169 connects the crankpin 168 to the crank arm 165. The shaft 166 is driven by an electric motor 171 by means of a gearbox 172, so that by operating the motor 171, the guide 162 can be moved between its extreme positions.

The edge of the disc 167 is cut away over part of its periphery, and a micro-switch is mounted on the frame of the apparatus so that its operating lever presses against the edge of the disc. The switch is arranged as a limit switch for controlling the movement of the guide 162 from one of its extreme positions to the other.

A conveyor belt assembly, consisting of a wide belt 175 passing around two rollers 176 mounted on rotatable shafts 177, is mounted on the frame of the apparatus beneath the position occupied by the lower carriage assembly when it is at its furthest from the camera. Another conveyor belt assembly, consisting of a wide belt 178 passing around two rollers 179 mounted on rotatable shafts 181, is mounted on the frame of the apparatus generally beneath the belt 175. A shaft 182 is rotatably mounted on the frame of the apparatus above the end of the belt 178 nearer the camera and carries a roller 183. Two rollers 184, which are much shorter axially than the roller 183, are rotatably mounted on the frame of the apparatus, one near each end of the roller 183, and with their axes in line and above that of roller 183. A pulley 185 is fixed to one of the shafts 177 supporting the belt 175, and is driven by a driving belt 186 from a pulley 187. Another pulley 188 is integral with the pulley 187, which is rotatably mounted on the frame of the apparatus. Pulleys 189 and 191 are fixed to the shaft 182 and one of the shafts 181 supporting the belt 178 respectively; pulleys 188, 189 and 191 are all driven by a driving belt 192 from a pulley 193, which is driven through a reduction gearbox 194 by an electric motor 195. The motor 195 can be rotated so that the upper surface of belt 175 runs towards the camera and the upper surfaces of belt 178 and roller 183 run away from the camera.

Belts 175 and 178, roller 183, and their driving mechanism, and rollers 184 all form part of the subassembly 111.

The operation of the film conveying and stripping mechanisms will now be described. By operation of the electric motor 132 the carriage 129 is moved towards the camera. After a certain amount of movement, the carriage 129 begins to move the carriage assembly 122 so that they both move towards the camera. During this movement the clamp 128 is open while clamp 121 is reclosed. When the clamps approach their extreme position nearest the camera, the long leader strip 45 of a film unit in the cassette will enter between the jaws of the upper clamp 128 and as the clamp 128 finally reaches its extreme position near the camera, the latch 145 will engage the stop 149 and the clamp will be triggered shut, gripping the leader strip 45. Also, the clamp 121 will be opened by the projection 141. The electric motor 132 continues to run and moves the carriage 129 away from the camera, drawing the leader strip 45 with it. The leader strip 45' of the following film unit is lightly attached to the leader strip 45, and is unfolded as the leader strip 45 is drawn out. When it is completely unfolded, in preparation for drawing out the following film unit, it becomes detached from the leader strip 45.

Also, as the leader strip 45 is drawn out, the exposed film 39 is drawn around the guide plate upper end 37 of the separator plate 36 until the exposed surface of the film 39 lies against the transfer sheet 41. This also draws the leader tab 46 out of the cassette and this passes between the rollers 104 and then between the jaws of the lower clamp 121, which has not yet moved away from the camera because of the lost motion in the connection between carriages 122 and 129. A spring detent 201 is provided to ensure that the carriage assembly 122 does not begin to move prematurely. When the carriage assembly 122 does begin to move, the projection 141 will no longer hold the clamp 121 open, and the leader tab 46 will be gripped by the clamp. Further movement of the carriages 122 and 129 will cause the lower clamp 121 to draw the entire film unit out of the cassette and will also cause the leader strip 45 to become detached from the connecting strip 42. As the film unit passes between the rollers 104, the pod 43 will be ruptured and the developing fluid contained therein will be spread evenly between the contacting surfaces of the exposed film 39 and the transfer sheet 41. When the leading edge of the film unit reaches the stripping unit, the motor 132 is cut out, the motor 195 is started and the motor 171 is also operated so that the guide 162 is moved from its normal position clear of the film unit into engagement with the film unit. After a delay period, during which the film is held in a dwell position for a length of time appropriate to develop the film and transfer the image to the transfer sheet, the motor 132 restarts and continues to draw the two clamps away from the camera. As can be seen in FIG. 14, the film is directed around the rods in such a way that there is a sharp change in direction in its path. The connecting strip 44 is quite flexible and is able to follow this change in direction but the transfer sheet is of fairly stiff material and tends to separate from the backing and to continue along a straight path. Accordingly, the leading edge of the transfer sheet separates from the connecting strip and is guided by fixed guides (not shown) between the roller 183 and the roller 184. The rotation of roller 183 tends to move the transfer sheet away from the camera so that it drops onto conveyor belt 178, which delivers it to the print-receiving chute 196 for delivery to the customer.

Shortly before the clamp 121 reaches its extreme position, the lever 144 engages the stop 143 so that the clamp is opened, thereby releasing the leader tab 46. Similarly, when clamp 128 reaches its extreme position, the lever 147 engages the stop 148, so that the clamp is opened. The leader strip 45 is thereby released, and is ejected by the springs 151. The leader strip 45 and leader tab 46 are then carried towards the camera by the conveyor belt 175, and drop between the belt 175 and the stripping unit into the receptacle 72 for disposal.

The motors 132 and 195 are now cut out, and the motor 171 is operated to retract guide 162 to its normal position. This completes the cycle.

Above the position occupied by the film unit during development, a lamp (not shown) is mounted, shining downwards. Below the lamp a photo-transistor (also not shown) is mounted, so that the presence of a film unit between the lamp and the photo-transistor can be detected. If, at the appropriate stage in the cycle, no film unit is detected because of a malfunction or because of a faulty cassette, an alarm signal is actuated, and may be used to indicate to the sitter that there has been a malfunction, and to actuate the cassette handling apparatus to replace the cassette.

Whenever a fresh cassette has been transferred to the camera, the opaque sheet 38 is removed. To do this, the apparatus follows the normal cycle, but without the delay needed for development. The opaque cover sheet is gripped by the upper clamp 128 and drawn out; it passes through the stripping apparatus in the same way as an ordinary film unit, and because of this it is curled to the shape shown in FIG. 15. This ensures that the cover will fall into the receptacle 72 without jamming between the stripper guides and the conveyor belt 175; if the cover were not curled by the stripping apparatus, it would probably jam. The opaque sheet 38 is lightly attached by paste to the leader strip 45 of the first film unit so that as the opaque sheet is drawn out of the cassette the leader strip is unfolded and drawn out. The leader strip 45 separates from the opaque sheet as soon as it is unfolded and the opaque sheet continues without it. This leaves the leader strip in a position ready to be engaged by the upper clamp 121 after the first film unit is exposed.

The way in which the sub-assembly 111 is mounted in the apparatus will now be described. In its normal position, the sub-assembly 111 is located by two dowel pins 112 and supported by four rollers 113 which are rotatably attached to the frame of the apparatus. Each roller supports one of four supporting brackets 114 which are attached to the sub-assembly 111. In the normal position, a horizontal surface of each bracket 114 rests on each roller 113, but when the sub-assembly is removed for maintenance, the dowel pins 112 and the pin 86 disengage, and an inclined surface of each bracket 114 comes into contact with each roller, so that the sub-assembly is lowered as it is withdrawn.

Four pins 115 are attached to the sub-assembly 111, and each engages one of four vertical open ended slots 116 in plates 117. The plates 117 are attached to slide 118, which can slide in the direction of arrow 87 on guide rails 119.

When the sub-assembly is in its normal position, the pins 115 do not touch the bottom of slots 116, but as the sub-assembly is removed, it is lowered until the pins 115 are resting on the bottom of slots 116, so that the sub-assembly is supported on slide 118. When the slide 118 has been drawn out to its extreme position, the sub-assembly 111 can easily be removed.

Electrical connections to the apparatus on the sub-assembly are made by means of a multi-way connector which engages a corresponding connector mounted on the frame of the apparatus. These connectors disengage as the sub-assembly 111 is withdrawn, in the same manner as the dowel pins 112.

The electrical circuits of the apparatus are mounted on another sub-assembly 205, which is mounted on slides 206; the electrical connections to this subassembly are made in a similar manner to those to the sub-assembly 111.

What I claim as my invention and desire to secure by Letter Patent is:

1. Automatic photographic apparatus comprising a camera; a magazine for cassettes, each comprising a number of self-developing film units; transfer means for replacing an expended cassette at said camera by a cassette from said magazine, said transfer means comprising a conveyor extending from said magazine to said camera; and means for determining the emptiness of the cassette at the camera to initiate the operation of said transfer means.

2. Apparatus according to claim 1 in which the optical axis of said camera is vertical and said conveyor comprises a support element having an upper surface to support a cassette and drive means to reciprocate said support element beneath said magazine.

3. Apparatus according to claim 2 in which said support element has an abutment to engage the edge of a cassette remote from the camera.

4. Apparatus according to claim 2 which includes a one-way gate preventing cassettes moved beyond said gate on a forward stroke of said support element returning on a rearward stroke.

5. Apparatus according to claim 2 which includes a stationary track extending from the end of said support element remote from said magazine to said camera.

6. Apparatus according to claim 2 in which said magazine includes a number of vertical chutes for cassettes, each chute except that nearest the camera including a dummy cassette, there being means to prevent said dummy cassette from being conveyed along the conveyor beyond a predetermined point.

7. Apparatus according to claim 6 in which said preventor means comprises a projection on said dummy cassette engageable with a stop on the support element.

8. Apparatus according to claim 2 in which said magazine comprises a vertical chute for cassettes, said chute having a ledge at the bottom facing towards said camera, and pusher means arranged to push the bottom cassette off said ledge when said support element approaches its position furthest from said camera.

9. Apparatus according to claim 2 which includes a carrier beneath said camera located to receive a cassette from said conveyor and means to raise said carrier with a cassette towards said camera.

10. Apparatus according to claim 9 in which said raising means are synchronised with said conveyor.

11. Apparatus according to claim 10 in which said raising means comprises a ramp element and a ramp follower element, one of said elements being connected to the conveyor drive means and the other of said elements being connected to said carrier.

12. Photographic apparatus comprising a camera having a horizontal focal plane and an open bottom in said focal plane; a magazine comprising a vertical chute with an open bottom end; a vertical stack of cassettes in said magazine, each cassette comprising a number of self-developing film units and said cassettes being generally flat and lying with their planes horizontal; horizontal cassette guide means extending from said bottom end to said camera; a reciprocating pusher mounted to move back and forth beneath said bottom end to push stepwise a row of cassettes lying in contact side-by-side and with their planes in a common horizontal plane towards and beyond said camera; a carrier beneath the camera located to receive a cassette in said row; and means synchronized with said pusher to raise said carrier with said received cassette to said open bottom of said camera; whereby each cassette in its turn leaves the bottom of said magazine to join one end of said row, is pushed along said guide means in steps to said carrier, is raised by said carrier to said camera, is lowered again, and is pushed beyond said camera by a succeeding cassette moving to said carrier.

* * * * *